(12) United States Patent
McCarthy et al.

(10) Patent No.: US 7,894,128 B2
(45) Date of Patent: Feb. 22, 2011

(54) REAL-TIME TERAHERTZ IMAGING SYSTEM FOR THE DETECTION OF CONCEALED OBJECTS

(75) Inventors: John C. McCarthy, Stratham, NH (US); Daniel Creeden, Nashua, NH (US); Peter A. Ketteridge, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 300 days.

(21) Appl. No.: 12/012,401

(22) Filed: Feb. 1, 2008

(65) Prior Publication Data

US 2009/0091820 A1   Apr. 9, 2009

Related U.S. Application Data

(60) Provisional application No. 60/898,875, filed on Feb. 1, 2007.

(51) Int. Cl.
*H04B 10/17* (2006.01)

(52) U.S. Cl. .............................. 359/341.33; 359/341.2

(58) Field of Classification Search .............. 359/341.2, 359/341.33
See application file for complete search history.

(56) References Cited

U.S. PATENT DOCUMENTS

| 4,423,511 | A | * | 12/1983 | Morton ...................... 372/95 |
| 4,896,930 | A | * | 1/1990 | Tsuchitani et al. .......... 385/122 |
| 5,206,922 | A | * | 4/1993 | Westland et al. ............... 385/5 |
| 5,729,380 | A | * | 3/1998 | Betin et al. ................. 359/300 |
| 5,835,199 | A | * | 11/1998 | Phillips et al. ............. 356/5.03 |
| 6,008,933 | A | * | 12/1999 | Grubb et al. .............. 359/341.1 |
| 6,297,903 | B1 | * | 10/2001 | Grubb et al. .............. 359/341.3 |
| 6,519,078 | B2 | * | 2/2003 | Miyakawa et al. .......... 359/334 |
| 6,646,793 | B2 | * | 11/2003 | Bruesselbach et al. ...... 359/342 |
| 6,847,769 | B1 | * | 1/2005 | Robinson et al. ............ 385/123 |
| 2002/0001123 | A1 | * | 1/2002 | Miyakawa et al. .......... 359/334 |
| 2003/0063884 | A1 | * | 4/2003 | Smith et al. ................ 385/129 |
| 2005/0286603 | A1 | * | 12/2005 | Pomeranz ................... 372/101 |

OTHER PUBLICATIONS

Creeden et al, "Compact, high average power, fiber-pumped terahertz source for active real-time imaging of concealed objects", Optics Express, vol. 15, No. 10, pp. 6478-6483 (May 2007).*

(Continued)

*Primary Examiner*—Eric Bolda
(74) *Attorney, Agent, or Firm*—Daniel J. Long

(57) ABSTRACT

A terahertz imaging system and method of use including a compact Yb-doped fiber laser-pumped ZGP crystal as a THz source and an uncooled microbolometer array as a detector. According to the present invention, semiconductor lasers are also drive current modulated to produce desired laser pulse-width, repetition rate and wavelengths needed for DFG THz generation in various non-linear crystals. The fiber-coupled semiconductor lasers provide at least two wavelengths that will produce THz radiation by DFG in non-linear converter. These two wavelengths are combined and amplified in a single Yb fiber amplifier chain. Yb amplifier is staged in continually increasing core diameters to provide significant signal amplification while suppressing deleterious non-linear effects.

8 Claims, 2 Drawing Sheets

OTHER PUBLICATIONS

Chen, et al., THz Diffuse Reflectance Spectra of Selected Explosives and Related Compounds, *Terahertz for Military and Security Applications*, edited by R. Jennifer Hwu, Dwight L. Woolard, Mark J. Rosker, Proceedings of the SPIE vol. 5790 (SPIE, Bellingham, WA), May 2005, pp. 19-24.

Dickinson, et al., Terahertz Imaging of Subjects With Concealed Weapons, *Terahertz for Military and Security Applications IV*, edited by Dwight L. Woolard, R. Jennifer Hwu, Mark J. Rosker, James O. Jensen, *Proceedings of the SPIE* vol. 6212 (SPIE, Bellingham, WA, 2006), May 2006, pp. 1-12.

Lee, et al., Real-Time, Continuous-Wave Terahertz Imaging by Use of a Microbolometer Focal-Plane Array, 2005 Optical Society of America, *Optics Letters.*, vol. 30, No. 19, pp. 2563-2565, Oct. 1, 2005.

Liu, et al., Detection and Identification of Explosive RDX by THz Diffuse Reflection Spectroscopy, *Optics Express*, vol. 14, No. 1, pp. 415-423, Jan. 9, 2006.

Creeden, et al., Near Diffraction-Limited, 1064nm, All-Fiber Master Oscillator Fiber Amplifier (MOFA) with Enhanced SRS Suppression for Pulsed Nanosecond Applications, *2006 SSDLTR*, Albuquerque, NM, Jun. 13-15, 2006, 3 pages.

Creeden, et al., Fiber Laser Transmitter for LADAR Applications, *Proc. 2006 Meeting of the MSS Specialty Group on Active E-O Systems*, Monterey, CA, 2006, 4 pages.

Budni, et al., 10W Mid-IR Holmium Pumped $ZnGeP_2$ OPO, *OSA Trends in Optics and Photonics*, OSA TOPS, vol. 19, pp. 226-229 (1998).

\* cited by examiner

REAL-TIME TERAHERTZ IMAGING SYSTEM FOR THE DETECTION OF CONCEALED OBJECTS

CROSS REFERENCE TO RELATED APPLICATION

This application claims rights under 35 USC §119(e) from U.S. Application Ser. No. 60/898,875 filed Feb. 1, 2007, the contents of which are incorporated herein by reference.

BACKGROUND OF THE INVENTION

1. Field of the Invention

The present invention relates to lasers and more particularly to terahertz imaging systems.

2. Brief Description Of Prior Developments

Research into optical terahertz generation has gained interest due to its imaging and spectroscopic applications, as is disclosed in Y. Chen et al., "THz diffuse reflectance spectra of selected explosives and related compounds," in *Terahertz for Military and Security Applications*, edited by R. Jennifer Hwu, Dwight L. Woolard, Mark J. Rosker, Proceedings of the SPIE Vol. 5790 (SPIE, Bellingham, Wash.), May 2005; Jason C. Dickinson et al., "Terahertz imaging of subjects with concealed weapons," in *Terahertz for Military and Security Applications IV*, edited by Dwight L. Woolard, R. Jennifer Hwu, Mark J. Rosker, James O. Jensen, Proceedings of the SPIE Vol. 6212 (SPIE, Bellingham, Wash., 2006), May 2006; and A. W. M. Lee and Q. Hu, "Real-time, continuous-wave terahertz imaging by use of a microbolometer focal-plane array," *Opt. Lett.*, vol. 30, no. 19, pp. 2563-2565, October 2005, the contents of all which are incorporated herein by reference. Specifically, the ability to pass through clothing and various other materials without high levels of attenuation allows for imaging of concealed weapons. This ability is particularly of interest for real-time security screening. Concealed weapons detection is made possible by the transparency of clothing and fibrous materials in the THz region along with the high reflectance of metallic and dense objects. In addition, THz radiation is non-ionizing, which allows for safe illumination of human subjects. Potential applications include mail screening, luggage screening at airports, and concealed weapons screening on people. This technology may eventually reduce security bottlenecks and may also allow for the detection of non-metallic weapons made from fiberglass or other dense plastics that are invisible to metal detectors. Terahertz may also be used to detect various explosive and caustic substances, as is disclosed in H. Liu, Y. Chen, G. J. Bastiaans, and X.-C. Zhang, "Detection and identification of explosive RDX by THz diffuse reflection spectroscopy," *Opt. Express, vol.* 14, no. 1, pp. 415-423, January 2006, the contents of which are incorporated herein by reference, providing complete security screening capability in one packaged system.

Pulsed Yb-doped fiber systems have been successful in generating diffraction-limited, high peak-power, 1064 nm pulses at various pulse widths and repetition rates, as is disclosed in D. Creeden et al., "Near diffraction-limited, 1064 nm, all-fiber master oscillator fiber amplifier (MOFA) with enhanced SRS suppression for pulsed nanosecond applications," presented at the 2006 *SSDLTR*, Albuquerque, N. Mex., Jun. 13-15, 2006, Paper FIBER1-4; and D. Creeden et al., "Fiber laser transmitter for LADAR applications," in *Proc. 2006 Meting of the MSS Specialty Group on Active E-O Systems*, Monterey, Calif., 2006, the contents of which are incorporated herein by reference. This flexibility makes pulsed fiber sources ideal for driving frequency conversions in nonlinear crystals. Additionally, Yb-doped fiber has a large gain-bandwidth that allows for amplification over a large spectral range. This enables the amplification of two wavelengths simultaneously in a single gain fiber. Because of this, a single fiber laser system can be used to amplify two different signals which can then be difference frequency mixed in a nonlinear crystal to generate terahertz radiation. This reduces the complexity and cost of typical DFM based terahertz sources.

The development of nonlinear materials has also enabled efficient generation of THz radiation, as is disclosed in P. A. Budni, L. A. Pomeranz, M. L. Lemons, P. G. Schunemann, T. M. Pollak, and E. P. Chicklis, "10 W mid-IR holmium pumped ZnGeP2 OPO," in *OSA Trends in Optics and Photonics*, vol. 19, pp. 226-229 (1998), the contents of which are incorporated herein by reference. Zinc Germanium Phosphide (ZGP) combines high nonlinear gain and birefringence with relatively low THz loss. In addition, ZGP can be engineered to have low absorption in the 1 micron region, which makes it an ideal crystal for THz generation.

A need still exists, however, for an improved way to practice real-time terahertz imaging for the detection of concealed weapons or other concealed objects.

SUMMARY OF INVENTION

The present invention comprises a terahertz imaging system and method of use including a compact Yb-doped fiber laser-pumped ZGP crystal as a THz source and an uncooled microbolometer array as a detector. According to the present invention, semiconductor lasers are also drive current modulated to produce desired laser pulsewidth, repetition rate and wavelengths needed for DFG THz generation in various non-linear crystals. The fiber-coupled semiconductor lasers provide at least two wavelengths that will produce THz radiation by DFG in non-linear converter. These two wavelengths are combined and amplified in a single Yb fiber amplifier chain. Yb amplifier is staged in continually increasing core diameters to provide significant signal amplification while suppressing deleterious non-linear effects. Our approach utilizes the advancements made in both fiber amplification and material development to produce a compact THz imaging system with a commercially available uncooled microbolometer array.

BRIEF DESCRIPTION OF THE DRAWINGS

The present invention is further described with reference to the accompanying drawings wherein.

DETAILED DESCRIPTION OF THE PREFERRED EMBODIMENT

Figure 1:
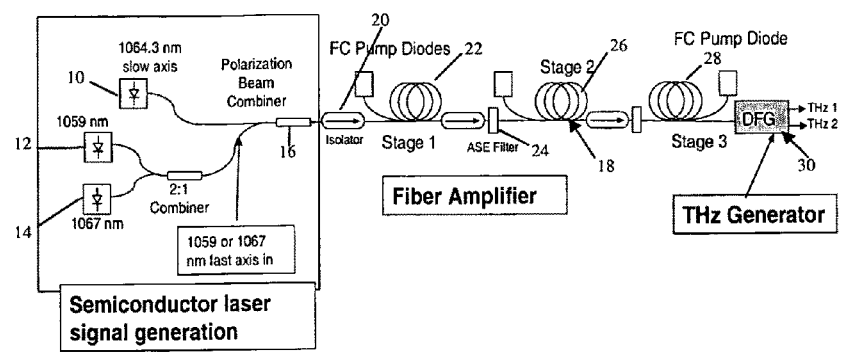
FIG. 1 is a schematic drawing of a tunable THz generator embodiment of the present invention.

Referring to FIG. 1, fiber coupled semiconductor diodes 10, 12, and 14 are tuned to generate different laser wavelengths of about 1064 nm. Current control to the semiconductor lasers selects one or both of the non-1064 nm wavelengths to be input to the polarization beam combiner 16 where it is combined with the 1064 nm signal in the fiber. There is also a fiber amplifier shown generally at 18 including an isolator 20, a stage 1 FC pump diode 22, an ASE filter 24, a stage 2 FC pump diode 26, and a stage 3 FC pump diode 28. There is also THz generator 30. Current control to the semiconductor laser diodes allows simple, flexible control of the waveform for high peak power (independent pulsewidth and repetition rate control) or average power (CW) applications. Semiconductor laser wavelength tuning (temperature or current) provides tunability of the output THz frequencies.

The semiconductor laser waveforms are then amplified in a diode-pumped Yb fiber for conversion to THz frequencies via Difference Frequency Generation (DFG) in ZGP, GaSe or Orientation-Patterned Gallium Arsenide.

EXAMPLE

Figure 2:
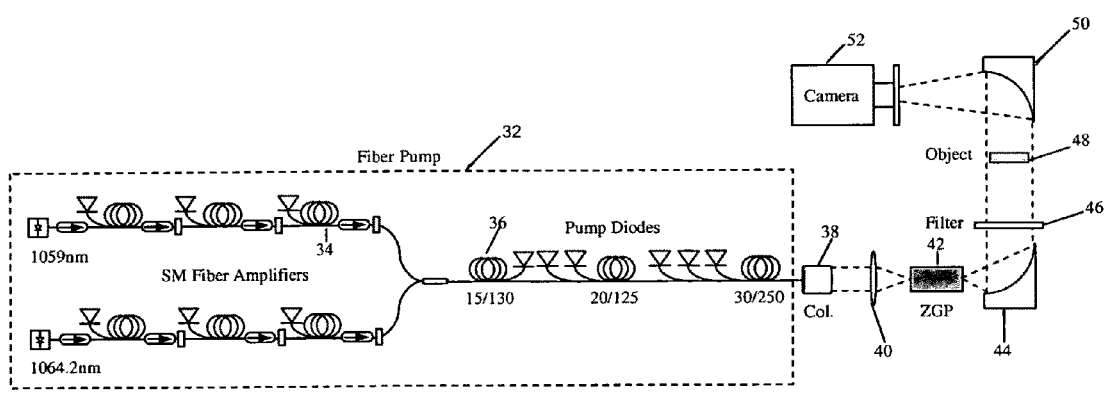
FIG. 2 is a schematic drawing of a preferred terahertz imaging system of the present invention.

This example was carried out using the apparatus shown in FIG. 2 in which a fiber pump 32 comprised of SM fiber amplifiers at 34 was used with pump diodes at 36. This fiber pump is used with a collimator 38, a lens 40, a ZGP crystal 42, a mirror 44, a filter 46, an object 48, a mirror 50, and a camera 52. For the terahertz source, two semiconductor seed diodes (centered at 1064.2 nm and 1059 nm), were used which were driven at 100 kHz with 1ns pulses, and pre-amplify those pulses in separate polarization maintaining (PM) single-mode amplifier stages. Those signals were then combined and amplified in a series of PM-LMA Yb-doped fiber amplifiers. The 1064.2 nm seed diode was fixed in wavelength, but the 1059 nm diode was tunable, which allowed for controlled tuning of the terahertz output signal. The nanosecond pulse width allowed for the generation of significant average and peak-power pulses at 1 micron with relatively low pulse energy. This promoted high average and peak-power THz generation and allows us to keep the pump fluence on the ZGP crystal below the surface damage threshold.

At the output of the fiber amplification system, the pump signals were collimated and focused directly into the ZGP crystal. The generated THz radiation was collimated with an off-axis parabolic mirror and was filtered using a Teflon sheet. The THz signal was then directed onto the focal plane array of the microbolometer with a parabolic mirror. The THz source was tunable from 0.8-2.45 THz and was only limited by the tuning range on the 1059 nm diode. At 2.45 THz (122 μm), the source nominally emits 2 mW of average power (28 W peak with a 700 ps THz pulse).

The camera used in this setup was an uncooled vanadium oxide MIM500H microbolometer array manufactured by BAE Systems, Lexington, Mass. It had a 320×240 focal plane array with a 46 μm detector pitch and is optimized for the far-IR wavelength range (8-14 μm); however, it remained sensitive in the THz region, which allowed for the detection of THz radiation. An RS-170 output from the camera was connected to a frame-grabber, which was used to capture and process the image data.

Figure 3:
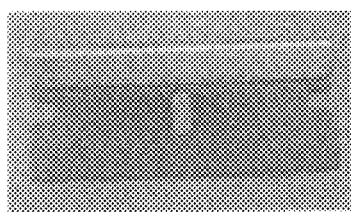
FIGS. 3(*a*) through 3(*f*) are photographs of objects used in THz imaging and false-color images of those objects concealed in a shipping envelope using the terahertz system; wherein, FIG. 3(*a*) is a razor blade, FIG. 3(*b*) is an imaged razor blade inside an envelope, FIG. 3(*c*) is a knife, FIG. 3(*d*) is an imaged knife inside an envelope, FIG. 3(*e*) is a fiberglass knife, and FIG. 3(*f*) is an imaged fiberglass knife inside an envelope.
Figure 3:
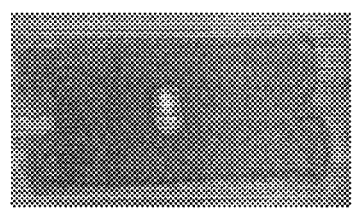
Figure 3:
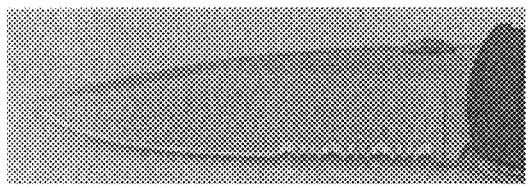
Figure 3:
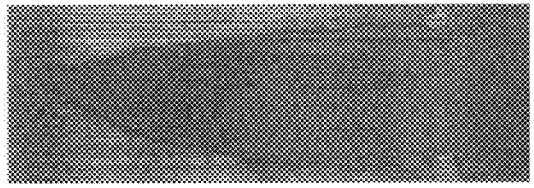
Figure 3:
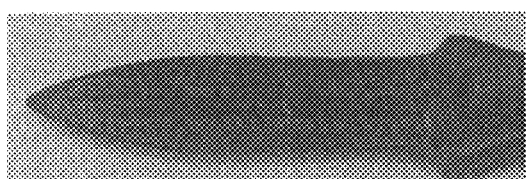
Figure 3:
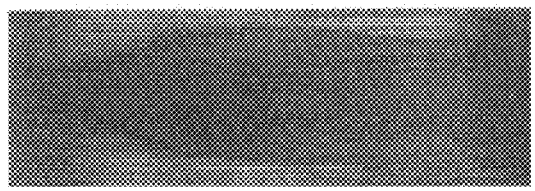

For concealed imaging, objects were placed in a DuPont Tyvek shipping envelope and are passed through the collimated portion of the THz beam 1 m from the camera. Results of these imaging experiments are shown in FIG. 3.

For these experiments, imaging was done with 250 μW of average power (3.5 W peak) at 2 THz, which filled approximately 30% of the focal plane. The background was subtracted, and the images were generated after integrating over 130 ms (8 frames). No additional signal processing was used. With this setup, we were successfully able to image a razor blade, a common pocket knife, and a black fiberglass knife that is undetectable to metal detectors. These images demonstrate the capability of real-time THz imaging systems for use in security screening. The ability to detect metallic objects as well as non-metallic weapons provides a distinct advantage to current security screening methods. With this system, we can not only image concealed objects, but we can examine the absorption, reflectance, and transparencies of different materials in the THz region to help us more accurately identify concealed objects and weapons. The terahertz imaging capability coupled with the detection of explosive and hazardous materials may provide a robust and complete real-time security screening solution without the need for multiple systems and detection methods.

Those skilled in the art will appreciate a real-time terahertz imaging system has been provided for the detection of concealed weapons or other concealed objects. If the pump power is scaled, the THz output power will increase, which will allow for average power real-time imaging at longer stand-off distances.

In these experiments, we successfully imaged objects concealed in a common shipping envelope with >3.5 W of peak power at 2 THz. Focusing this THz radiation onto a small number of pixels on the detector array will allow for a better SNR at longer ranges. This type of pulsed stand-off imaging cannot be achieved with CW or low power sources and may enable efficient stand-off imaging using commercially available receiver technology.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method of generating fiber amplifier input signals that are tunable in wavelength, pulsewidth, repetition rate and average power for imaging or peak detection applications comprising the steps of providing a cascaded fiber amplifier staging with increasing active core diameters for efficient amplification while suppressing deleterious non-linear effects, wherein a THz source generator is provided; and the step of amplifcation of multiple input sinals in a Yb-doped, Er-doped, Tm-doped fiber for Difference Frequency Generation (DPG) to THz wavelengths is performed.

2. The method of Claim 1 wherein the step of fiber amplification in either Polarization Maintaining (PM) or non PM fiber amplifiers is performed.

3. The method of Claim 1 wherein the step of polarization manipulation and control using combination of PM and non PM active and passive fiber sections and components is performed.

4. The method of Claim 1 wherein the step of amplification of two wavelengths with orthogonal polarizations in a single active PM or non-PM fiber is performed.

5. The method of claim 1 wherein the step of generation of THz radiation by Backward Wave Mixing (BWM) DFG in Zinc Germanium phosphide (ZGP) and GaSe from a fiber pump at wavelengths of about 1 micron is performed.

6. The method of Claim 1 wherein the step of generation of THz radiation by Backward Wave Mixing (BWM) DPG in ZGP and GaSe from a fiber pump at wavelengths of about 2 microns is performed.

7. The method of claim 1 wherein the step of generation of THz radiation by Backward Wave Mixing (BWM) DFG in ZGP and GaSe at wavelengths of about 4 microns is performed.

8. The method of claim 1 wherein the step of generation of THz radiation by Backward Wave Mixing (BWM) DFG in ZGP and GaSe from a fiber pump at wavelengths of about 1.5 microns is performed.

* * * * *